Oct. 22, 1929.　　　A. J. PEREYRA　　　1,732,567
TORTILLA MACHINE
Filed July 25, 1928　　　3 Sheets-Sheet 1

Inventor
Armanda J. Pereyra
By Carlos P. Griffin
Attorney

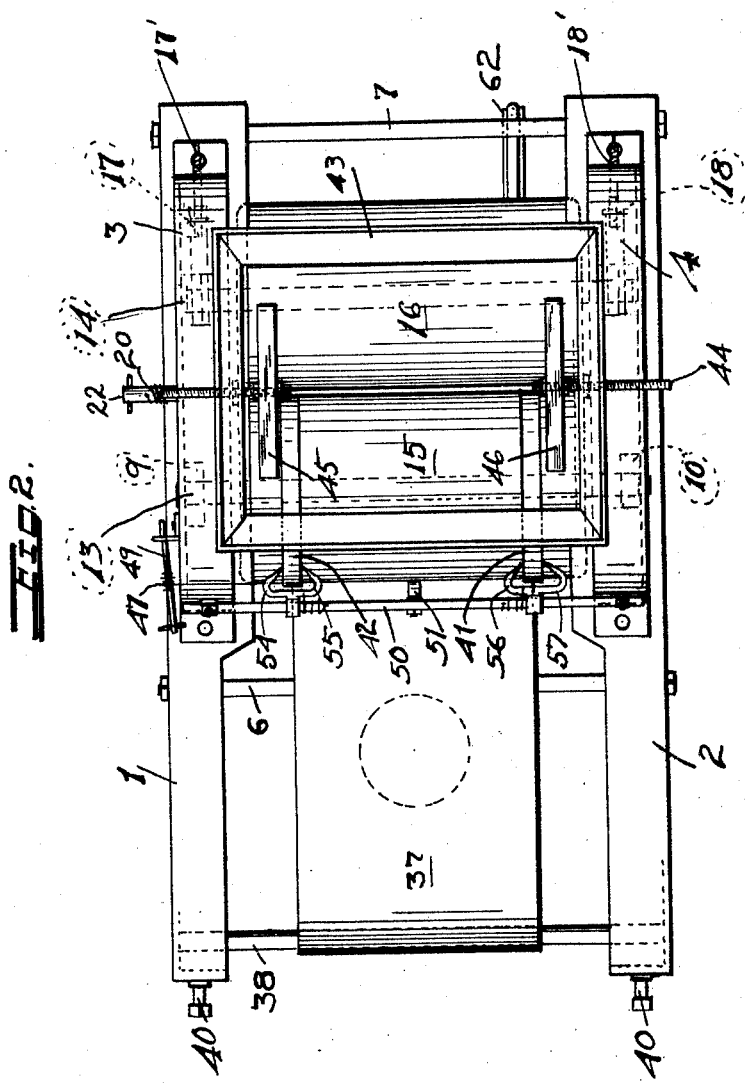

Oct. 22, 1929.  A. J. PEREYRA  1,732,567
TORTILLA MACHINE
Filed July 25, 1928   3 Sheets-Sheet 3
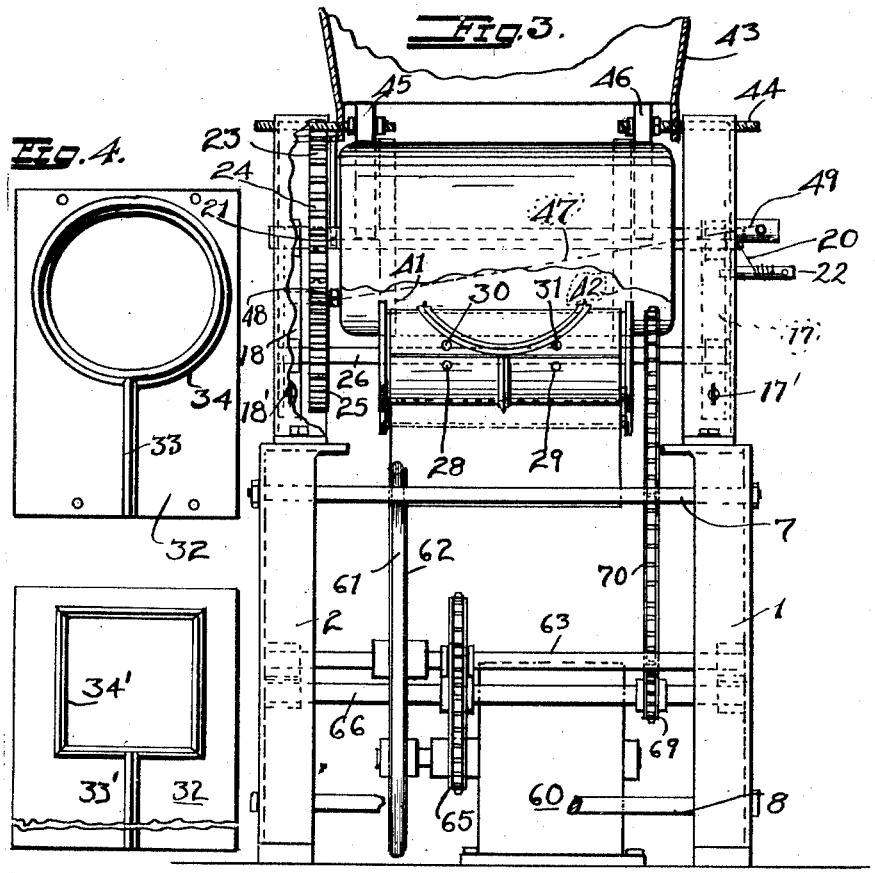
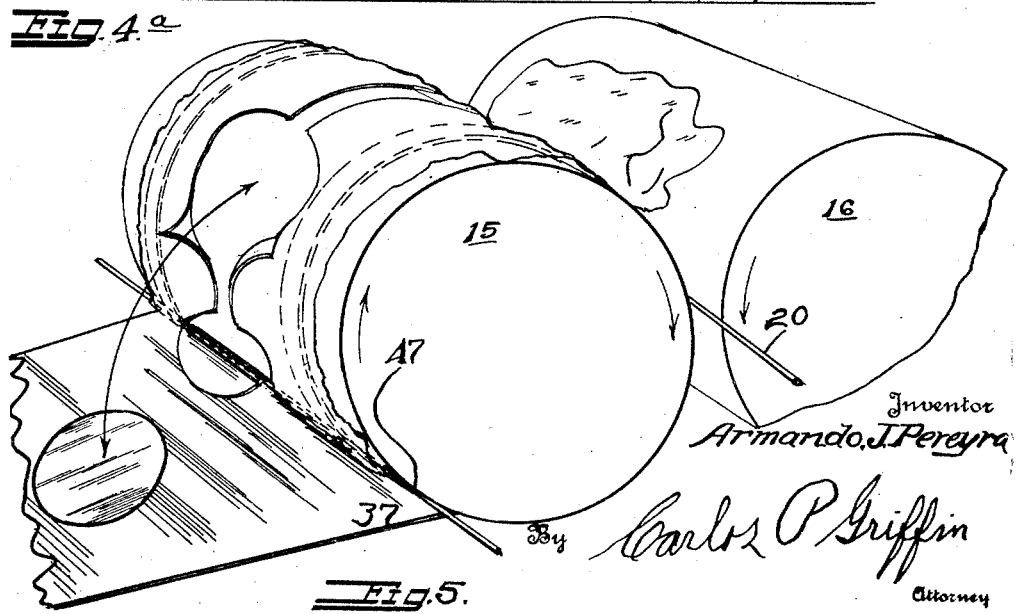
Inventor
Armando J. Pereyra
By Carlos P. Griffin
Attorney Patented Oct. 22, 1929

1,732,567

UNITED STATES PATENT OFFICE

ARMANDO J. PEREYRA, OF SAN FRANCISCO, CALIFORNIA

TORTILLA MACHINE

Application filed July 25, 1928. Serial No. 295,231.

This machine is for the purpose of making tortillas, and its object is to produce a machine which is capable of handling the sticky dough known as "tortilla dough" for the purpose of continuously producing tortillas therefrom mechanically.

It will be understood by those skilled in the art that the dough from which tortillas are made is a soft colloidal mass quite sticky, and with a very slight cohesiveness. It is of a consistency somewhat like that of the so-called "cottage cheese."

Heretofore it has been common to produce the uncooked tortillas, which are flat cakes about $\frac{1}{16}$th of an inch in thickness and 6 to 10 inches in width, by taking up a mass of dough and patting it out by hand, a quite laborious process. The uncooked tortilla in this condition is barely strong enough to hold together even when carefully picked up and handled.

With the present invention the tortilla dough is placed between two rollers, and means is provided to rotate the rollers and draw between them a layer of dough which adheres to both of them. Means is then provided to scrape the dough off one of the rollers to allow the dough strip to adhere to the other roller. The individual cakes are then cut and scraped off, all of the excess dough being then returned to the dough hopper, whereby there will be discharged continuously from the machine a series of well formed tortillas.

Another object of the invention is to provide means for scraping the dough off one of the rollers first, then to scrape all of the dough off the other roller, and finally to provide means for drawing the remaining unused quantity of dough back to the dough hopper to be used in making additional tortillas.

Other objects of the invention will be apparent as the description proceeds.

An embodiment of the invention is shown in the accompanying drawings in which the same reference numeral is applied to the same portion throughout the several figures of the drawings and of which there may be modifications.

Figure 2 is a plan view of the machine complete,

Figure 1:
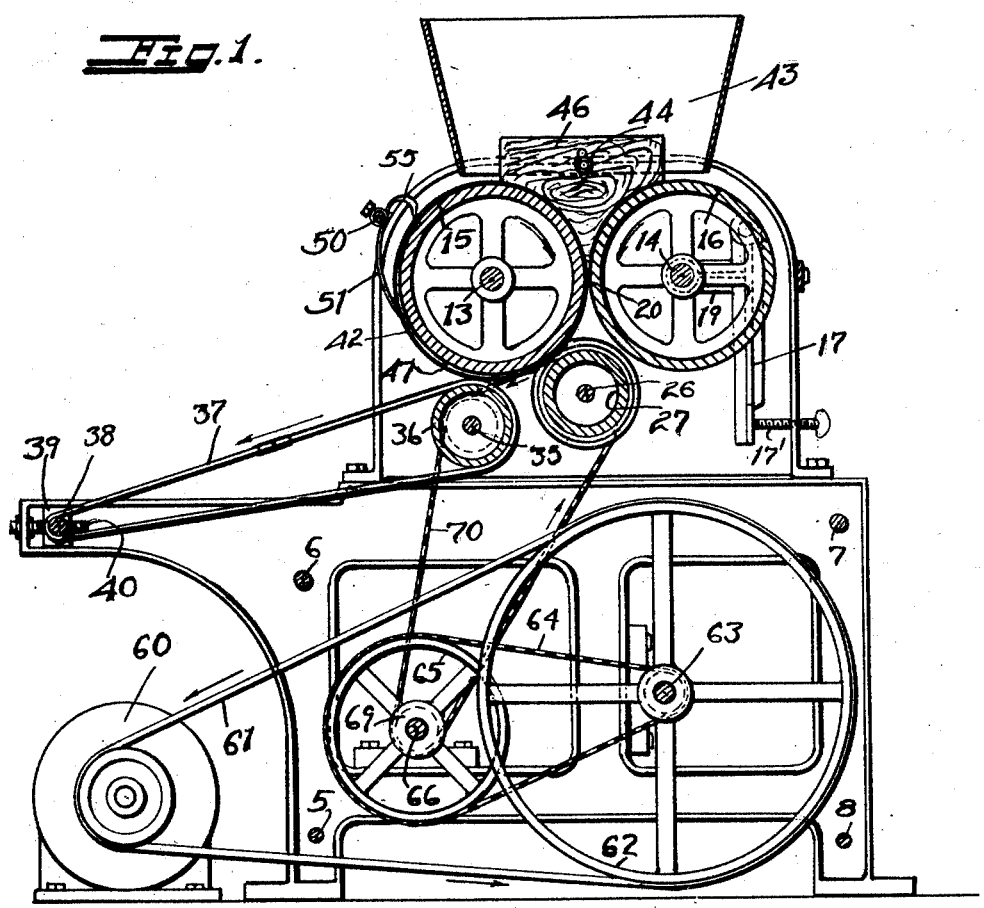
Figure 1 is a vertical sectional view through the complete machine.

Figure 3 is an end elevation of the complete machine, parts being broken away for purpose of illustration, Figure 4 is a plan view of the rubber cutter used to form the tortilla, and Figure 4$^a$ is a view of the rubber die for cutting square tortillas instead of round ones, Figure 5 is a perspective view of the two dough feeding rolls, and the belt which takes the cut-out tortilla away from the machine.

The machine is built upon four frames 1, 2, 3 and 4. The two latter frames are bolted to the top of the two longer frames 1 and 2. These frames are connected together by means of transverse stay bolts 5 to 8 inclusive, so that they will stand parallel to each other and about eighteen inches apart.

The upper frames are provided with thickened bosses at 9 and 10, which bosses form bearings for the shaft 13, which supports the roller 15.

Inside each of the frames 3 and 4 there is a depending arm, as shown at 17 and 18. Each of these arms has a forwardly projecting member 19 to provide a journal bearing for the shaft 14 which carries the roller 16.

Just below the line joining the centers of the shafts 13 and 14 there is a wire 20, which wire has a fastener 21 at one end, and a pin tightener 22 at the other end, said wire bearing tightly on the roller 16.

The two rollers 15 and 16 are driven in unison with each other by two equal size gears 23 and 24, which gears are in turn driven by the gear 25 on the shaft 26 carrying the roller 27. The roller 27 is provided with four pins 28 to 31 inclusive, which pins serve to hold a sheet rubber cover 32 in place, said sheet rubber being shown extended in Figure 4. This cover has a rib 33 extending longitudinally thereof and connects with a more or less elliptical rim 34 for the purpose of cutting out the tortilla, the longitudinal rib being for the purpose of splitting the excess mass of material that adheres to the roll 15, whereby it is prevented from accumulating on the spring scraper 51.

Immediately under the roll 15 there is a shaft 35 which carries a roller 36 around which the discharge belt 37 passes. The discharge belt also passes around a very small rod 38 at its outer end, said rod being revoluble in a box 39 in each of the side frames 1 and 2; a screw 40 in each frame serving to adjust the position of the rod to make the belt 37 tight. The object of this small rod is to give the belt a very sharp turn at that point so that it will break the tortilla loose from the belt should it happen to stick slightly at that place.

Surrounding the roller 15 are two thin metal rings 41, 42, said rings being for the purpose of continuously taking back to the hopper 43 the excess dough. The hopper 43 is supported by two transverse threaded studs 44' each of which studs also carries a pair of end boards 45, 46 curved to fit the rollers to confine the dough to a space between the ends of the rolls 15 and 16.

The arms 17 and 18 each have a bolt, as indicated at 17', 18' for the purpose of adjusting the position of the roller 16 with respect to the roller 15, so that a tortilla of the proper thickness will be formed when the dough passes between said rollers.

In order to lift the dough off the roll 15 there is a wire 47, which wire is connected to a hook 48 on one end, and to a tightening pin 49 in the other end, and this wire is diagonally placed with respect to the roller 15 as indicated in Figure 3, said wire passing under the rings 41, 42. The object of this is to scrape the roll clean while permitting the dough to adhere to the rings to be pulled back into the feed hopper 43.

In order to insure the rings 41 and 42 being held in the proper place on the roller 15 at all times there are four fingers 54 to 57. Extending across the machine there is a shaft 50, which shaft carries a spring 51 bearing upon the center of the roll 15 to make certain that the dough is pushed away from the roll, and at the same time there are two pairs of hooks 54, 55, 56, 57 supported by said rod, which hooks cut the dough at the side of, and hold the rings 41, 42 in the proper position on the roller. Said rings will adhere to the body of the dough within the hopper and to the roll 15 itself with such force as to pull the dough that would otherwise be wasted, back into the hopper.

The machine is driven from the motor 60 which has a belt 61 extending around a pulley 62 on the shaft 63 which is journalled in the frames 1 and 2. A sprocket chain 64 passes around a sprocket wheel on the shaft 63, and around a sprocket wheel 65 on the shaft 66; another sprocket wheel 69 forming the means to drive the sprocket chain 70 which drives the two rollers 27 and 36.

The operation of the machine is as follows:

A quantity of the tortilla dough is placed in the hopper between the two boards 45, 46, whereupon the machine may be started and the dough will be pulled through between the two rollers 15 and 16. However, the dough adhering to the roller 16 will be immediately released therefrom by the scraping action of the wire 20. Said roller is slightly convex to aid in effecting this result but the convexity only amounts to about 1/4 of an inch in a roll eighteen inches long. As rapidly as the dough is pulled through the machine, the roller 27 with its rubber cutter ring 34 will cut a section of dough and the wire 47 will detach all of the dough from the roller 15 as it rotates. While the roller 15 is rotating the individual tortillas will be dropping off on the belt 37, the spring 51 bearing on the center of the roll preventing them from continuing to adhere to the roll 15. As fast as the tortillas drop off onto the belt 37, the strips of dough at the sides of the tortilla will be drawn back into the hopper by the rings, which will move almost at the same rate as the rollers themselves.

It will be seen that with the cutter used in connection with this machine that the shape may be round or it may be square or rectangular, just as the operator wishes, the only necessity being to provide additional rubber cutters with the ridge formed thereon of the desired shape.

The special form of cover to produce the square tortillas is shown in Figure 4ª, in which 32' indicates the flat rubber sheet, 34' the cutter around the square portion of the tortilla, and 33' the rib for splitting the remaining bit of dough that is not formed into the tortilla.

The wires 20 and 47 are placed in the hooks at one side of the machine, and then wrapped around the pins 22 and 49, and these pins are then twisted to tighten the wire the mere friction of the pin bearing upon the side of the frame of the machine being sufficient to hold the wire at the desired tension.

Having thus described my invention, what I desire to secure by Letters Patent of the United States is as follows, but modifications may be made in carrying out the invention as shown in the drawing and in the above particularly described form thereof, within the purview of the annexed claims:

1. A tortilla making machine comprising a pair of rollers adapted to receive a batch of dough and pass the same between them, means to scrape off the dough on one of said rollers completely, means operating against the other roller to cut the dough into circular bodies, and means carried by the roller to draw the excess strip of dough back into the machine to be reworked.

2. A tortilla making machine comprising a pair of rollers adapted to receive a batch of dough, means to rotate the rollers to pass the dough between them, means to scrape the dough off of one of said rollers completely, means to cut the dough into individual pieces, means to separate the dough from the second roller, and means carried by the second roller to draw the excess dough back into the machine to be reworked.

3. A tortilla making machine comprising a pair of rollers adapted to receive a batch of dough, means to rotate the rollers to draw a thin layer of dough between them, means to completely remove the dough from one of the said rollers, means operating against the other roller to cut the dough into individual pieces, means to separate the dough and individual pieces from the second roller, and rings passing around the second roller to draw the excess dough back into the machine to be reworked.

4. A tortilla making machine comprising a pair of rollers adapted to receive a batch of dough, means to rotate the rollers to pull a thin strip of dough between them, means to remove the dough from one of said rollers completely, means operating against the other roller to cut the dough into individual pieces, means to separate the excess dough and the individual pieces from the second roller, and flat rings passing about the second roller near its end to draw the excess strip of dough back into the machine to be reworked.

5. A tortilla making machine comprising a pair of rollers adapted to receive a batch of dough, means to rotate the rollers to draw a strip of dough between them, tensioned wires in contact with the rollers to separate the dough therefrom, means to cut the dough strip into individual pieces, and flat rings passing over one of said wires to draw the excess strip of dough back into the machine to be reworked.

6. A tortilla making machine comprising a pair of rollers adapted to receive a batch of dough, means to rotate the rollers to draw a thin strip of dough between them, means to separate the dough from each of said rollers, means operating against one of the rollers to cut the dough into individual pieces, an endless belt upon which the individual pieces drop when cut, and means carried by the second roller to draw the excess strip of dough back into the machine to be reworked.

7. A tortilla making machine comprising a pair of rollers adapted to receive a batch of dough and pass the same between them, means to scrape off the dough from both of said rollers, a third roller under one of the rollers, a detachable rubber die carried by that roller for cutting the dough strip into individual pieces, and means carried by the second roller to draw the excess dough strip back into the machine to be reworked.

8. A tortilla making machine comprising a pair of rollers adapted to receive a batch of dough, means to rotate the rollers to pass a thin strip of dough between them, a tensioned wire bearing upon each roller to remove the dough therefrom, means to cut the dough strip into individual pieces bearing against the second roller, and a pair of endless rings passing around the second roller to draw the uncut dough strip back into the machine to be reworked.

9. A tortilla making machine comprising a pair of rollers adapted to receive a batch of dough, means to rotate them to draw a thin strip of dough between them, a pair of tensioned wires bearing upon the rollers to remove the dough therefrom, means operating against one of the rollers to cut the dough into individual pieces, a pair of flat rings carried by that roller to draw the uncut strip of dough back into the machine to be reworked, and a spring bearing upon that roller to separate the individual pieces from the roller.

In testimony whereof I have hereunto set my hand this 20 day of June, A. D. 1928.

ARMANDO J. PEREYRA.